(12) United States Patent
Leyden

(10) Patent No.: US 10,273,722 B2
(45) Date of Patent: Apr. 30, 2019

(54) SECURITY SYSTEM FOR ELECTRONIC DEVICE

(71) Applicant: Se-Kure Controls, Inc., Franklin Park, IL (US)

(72) Inventor: Roger J. Leyden, Inverness, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 311 days.

(21) Appl. No.: 15/373,641

(22) Filed: Dec. 9, 2016

(65) Prior Publication Data

US 2017/0167167 A1 Jun. 15, 2017

Related U.S. Application Data

(60) Provisional application No. 62/265,094, filed on Dec. 9, 2015.

(51) Int. Cl.
| | |
|---|---|
| *E05B 73/00* | (2006.01) |
| *E05B 45/06* | (2006.01) |
| *G06F 1/16* | (2006.01) |
| *G06F 21/00* | (2013.01) |

(52) U.S. Cl.
CPC .......... *E05B 73/0082* (2013.01); *E05B 45/06* (2013.01); *E05B 73/0005* (2013.01); *G06F 1/1679* (2013.01); *G06F 1/1684* (2013.01); *G06F 21/00* (2013.01)

(58) Field of Classification Search
CPC .. E05B 73/0082; E05B 45/06; E05B 73/0005; G06F 1/1679; G06F 1/1684; G06F 21/00
See application file for complete search history.

(56) References Cited

U.S. PATENT DOCUMENTS

| | | | | |
|---|---|---|---|---|
| 5,836,183 | A * | 11/1998 | Derman | E05B 73/0082 70/58 |
| 6,477,871 | B1 * | 11/2002 | Shaw | E05B 73/0082 248/551 |
| 7,007,912 | B1 * | 3/2006 | Giuliani | E05B 73/0082 248/552 |
| 7,174,752 | B2 * | 2/2007 | Galant | E05B 73/0082 248/553 |
| 8,720,848 | B2 * | 5/2014 | Tan | E05B 73/0082 248/346.01 |
| 2016/0340936 | A1 * | 11/2016 | Burt | E05B 73/0082 |
| 2018/0252003 | A1 * | 9/2018 | Klinkman | E05B 73/0082 |

* cited by examiner

*Primary Examiner* — Jayprakash N Gandhi
*Assistant Examiner* — Hung Dang
(74) *Attorney, Agent, or Firm* — Wood, Phillips, Katz, Clark & Mortimer

(57) ABSTRACT

The combination of: a) an electronic device having a wall portion with first and second ends and at least one enlargement on each of opposite sides of the wall portion; and b) a security system. The security system is made up of an elongate body, with third and fourth ends, and a connecting assembly. The body has first and second legs and a base joined together to cooperatively define a "U" shape. The connecting assembly and the body are configured so that with the security system operatively positioned, the first and second legs, base, and connecting assembly cooperatively encircle the elongate wall portion and the body is confined between at least first and second of the enlargements on the opposite sides of the elongate wall portion. In one form, a tether is secured to the connecting assembly and to a fixed support.

20 Claims, 6 Drawing Sheets

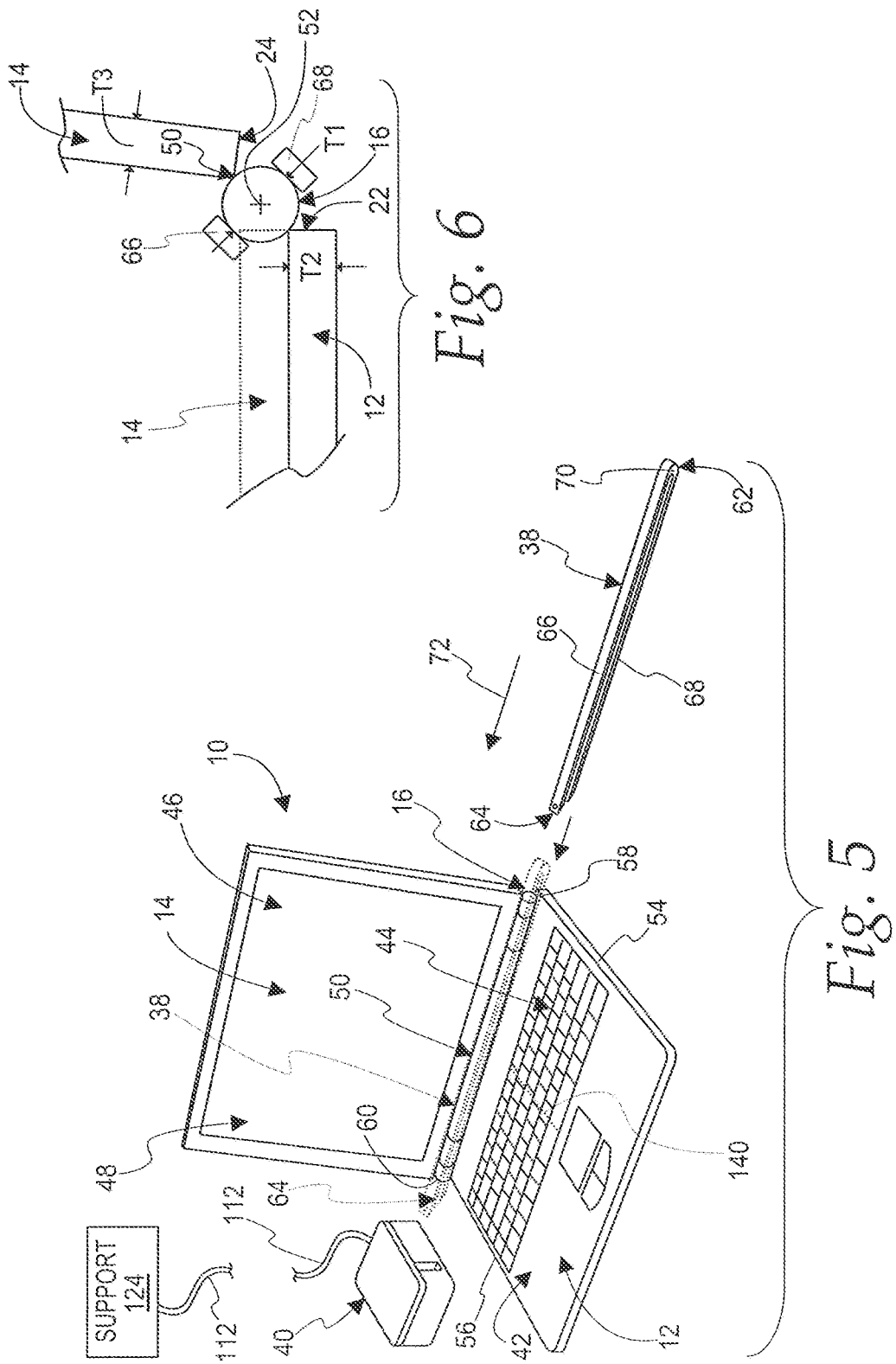

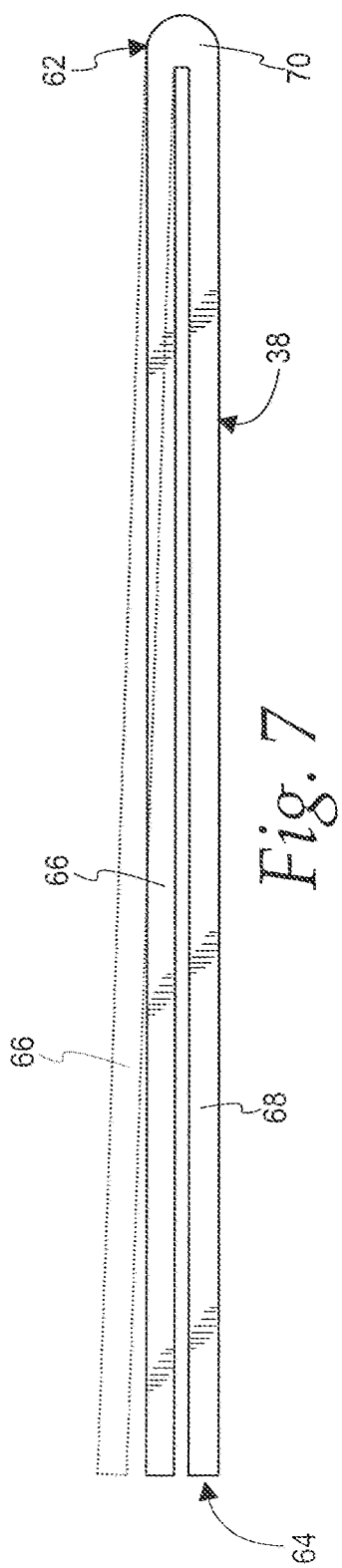
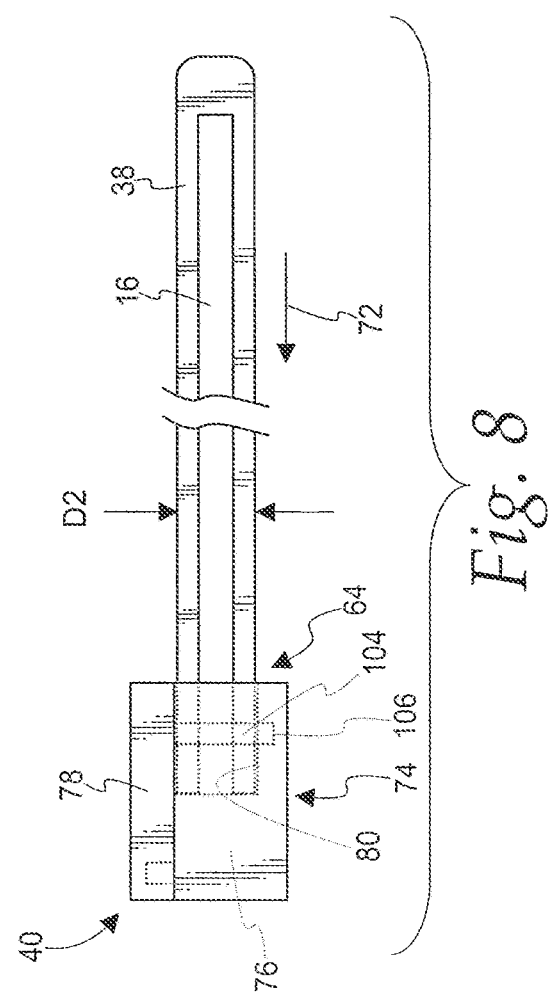

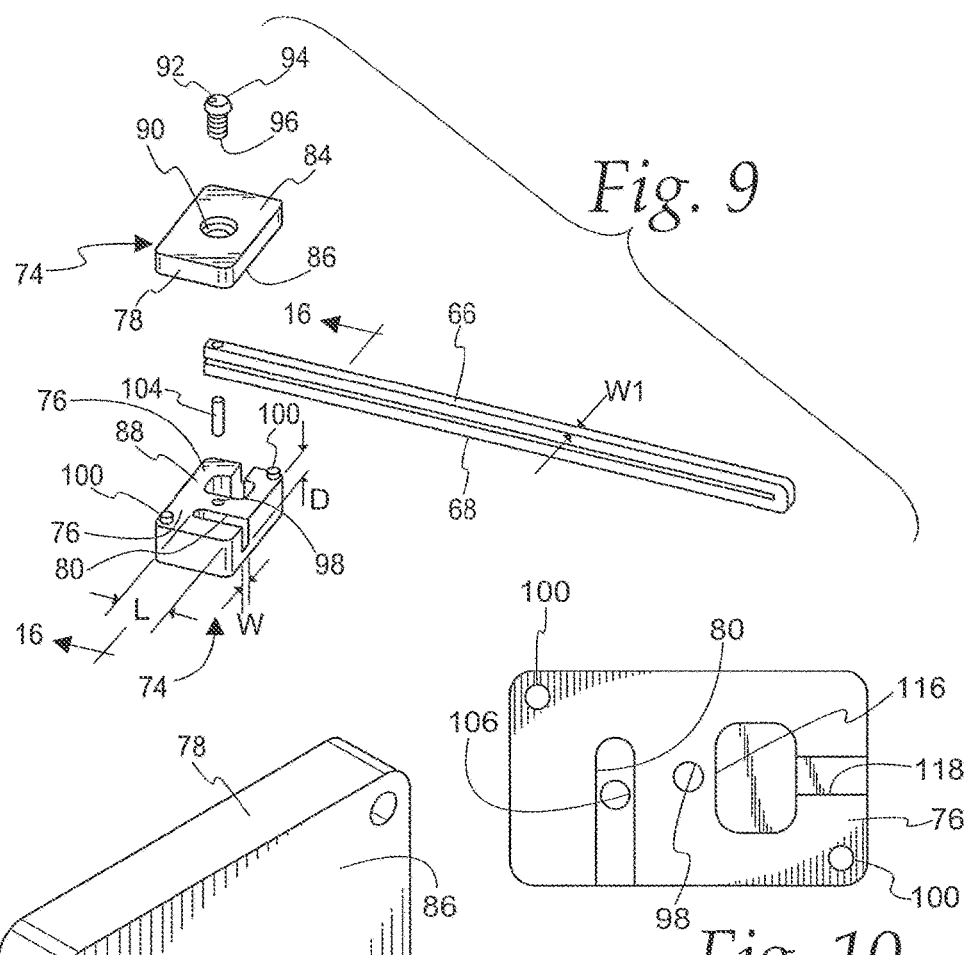
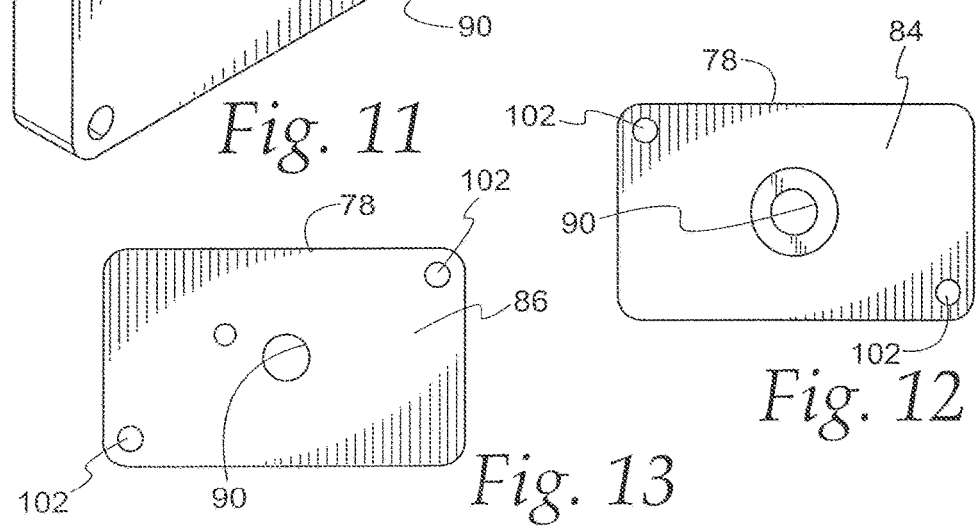

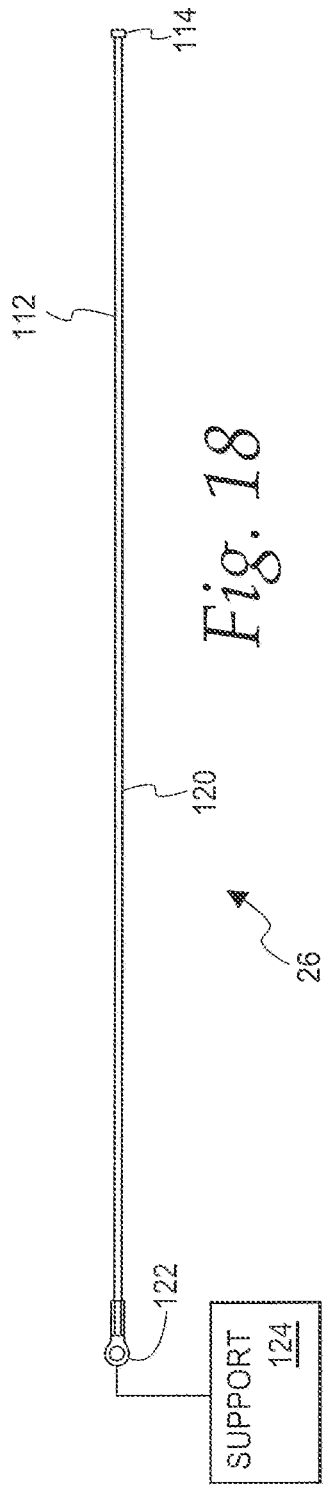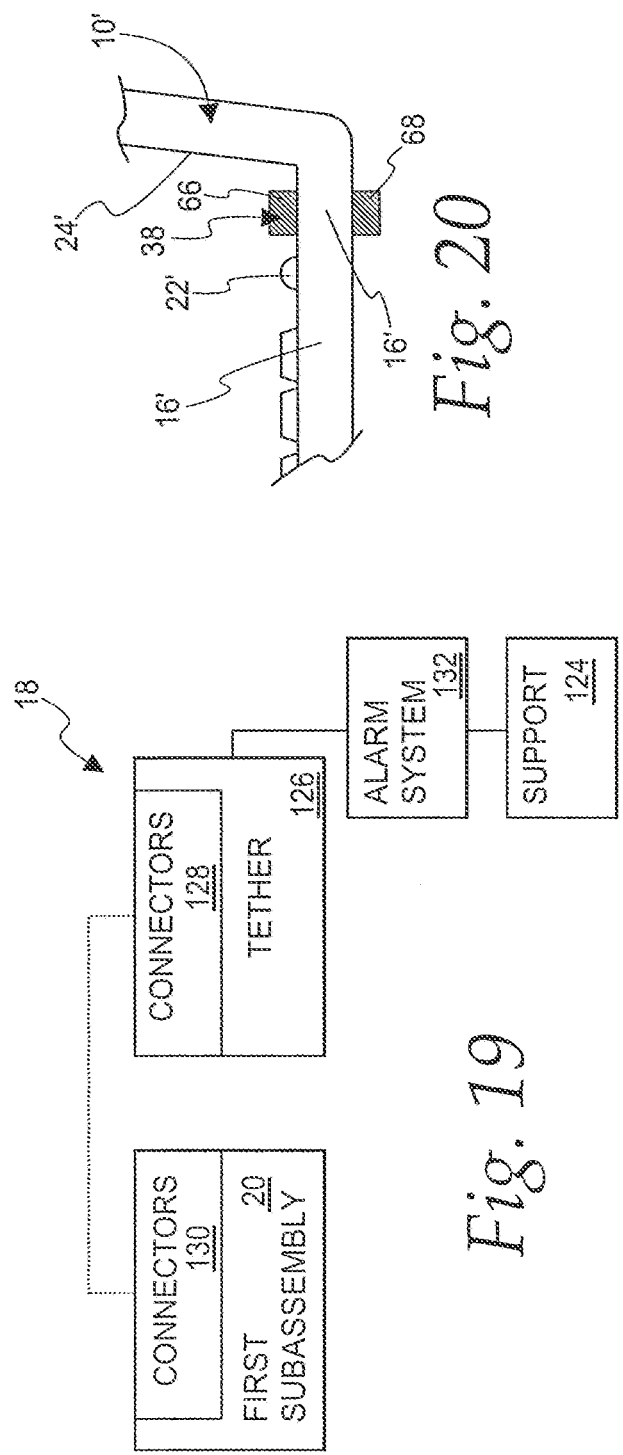

SECURITY SYSTEM FOR ELECTRONIC DEVICE

BACKGROUND OF THE INVENTION

Field of the Invention

This invention relates to security systems and, more particularly, to a security system that is usable to confine a portable electronic device relative to a support, such as at a point-of-purchase display, and/or to monitor movement of the portable electronic device.

Background Art

A multitude of electronic devices are displayed in retail operations to allow potential purchasers to inspect and potentially operate the same. As one example, the electronic device might be a self-contained system, such as a laptop computer, with relatively movable housing parts as on which a keyboard and monitor are provided. Alternatively, the electronic device might be an accessory, such as a keyboard, usable in conjunction with another device such as a tablet.

While often the cost of electronic devices, and the anticipated revenue loss from theft thereof, may warrant investment in sophisticated electronic security systems, oftentimes such an investment is not economically feasible. Since less expensive mechanical-type systems may not be available or practical, electronic devices are often left on displays without any type of security system employed. They thus make an appealing target for would-be thieves.

The industry continues to seek out designs of security systems that in a basic form are effective but which do not require an investment out of line with the anticipated losses attributable to theft.

SUMMARY OF THE INVENTION

In one form, the invention is directed to the combination of: a) an electronic device having a wall portion with first and second ends spaced in a lengthwise direction and at least one enlargement on each of opposite sides of the wall portion; and b) a security system. The security system has: a first subassembly that is configured to be placed in an operative position on the electronic device, wherein the first subassembly encircles the wall portion and is blocked from moving in opposite sideways direction by at least first and second of the enlargements; and a second subassembly. The second subassembly is configured to at least one of: i) maintain the first subassembly within a controlled distance relative to a support location; or ii) cause the generation of a detectable alarm signal in the event that one of: A) one of the security system and electronic device is reconfigured to allow the first subassembly to be changed from the operative position; B) the security system is reconfigured to allow the electronic device together with the first subassembly in the operative position to be moved beyond a first predetermined range from the support location; C) the electronic device together with the first subassembly in the operative position are moved beyond a second predetermined range from the support location without reconfiguring the electronic device or security system; and D) the electronic device together with the first subassembly in the operative position are moved in a predetermined manner relative to a detector/signal generator at a sensing location.

In one form, the first subassembly has an elongate body with third and fourth ends spaced in a lengthwise direction. The elongate body has first and second elongate legs and a base joined together at the third end of the body so that the first and second legs and base cooperatively define a "U" shape. Each of the first and second legs has a length.

In one form, the first and second legs and base are permanently joined together at the third end of the body.

In one form, the body is configured so that the first and second legs can be moved away from each other at the fourth end of the body to increase a width of the "U".

In one form, the security system further includes a connecting assembly. The connecting assembly and body are configured so that with the first subassembly in the operative position, the first and second legs, base, and connecting assembly cooperatively encircle the elongate wall portion.

In one form, the second subassembly is a tether projecting from the first subassembly.

In one form, the connecting assembly has a housing with first and second joinable parts. The first and second legs at the fourth end of the body are captively maintained between the first and second housing parts with the first subassembly in the operative position.

In one form, the first subassembly has a component that extends into: a) the body, at the fourth end of the body; and b) the housing to prevent separation of the fourth end of the body from the housing with the first subassembly in the operative position.

In one form, the component extends through each of the first and second legs.

In one form, the second subassembly is a tether with an anchor component. The housing is configured to define a receptacle for the anchor component.

In one form, there are connectors on the first and second housing parts that cooperate to align the first and second housing parts in a predetermined joined relationship.

In one form, the connecting assembly further includes a threaded fastener that is configured to releasably maintain the first and second housing parts in a joined relationship.

In one form, the connecting assembly has a housing with first and second joinable parts. The housing defines a receptacle for the fourth end of the body.

In one form, the connecting assembly further includes a component that interacts between the housing and fourth end of the body to prevent withdrawal of the fourth end of the body from the housing receptacle with the first subassembly in the operative position.

In one form, the component is an elongate post.

In one form, the second subassembly has a first assembly configured to cooperate with a second assembly with the second assembly at the support location. The first and second assemblies are configured to cooperate with each other to cause generation of a detectable alarm signal as an incident of the first assembly moving either: a) beyond a second predetermined range from the support location; or b) in the predetermined manner relative to the second assembly that makes up at least a part of the detector/signal generator at the sensing location.

In one form, the electronic device has first and second parts between which the wall portion resides.

In one form, the electronic device is one of: a) a tablet; b) a personal computer; c) a device with a keyboard and monitor, and d) a keyboard.

In one form, the second subassembly has an elongate cord extending between the electronic device and an anchoring location. The elongate cord defines a part of an electronic circuit including an alarm signal generator.

In one form, the invention is directed to the security system described above.

BRIEF DESCRIPTION OF THE DRAWINGS

FIG. 5 is a perspective view of one exemplary form of electronic device, as shown in FIGS. 1 and 2, and an exploded view of the inventive security system;

FIG. 6 is an enlarged, fragmentary, side elevation view of the device in FIG. 1, with legs on the first subassembly shown in dotted lines with the first subassembly in an operative position;

FIG. 7 is an enlarged, side elevation view of the body on the first subassembly;

FIG. 8 is an enlarged, fragmentary, side elevation view showing the connection between the body and connecting assembly on the first subassembly;

FIG. 9 is an exploded perspective view of the body and connecting assembly on the first subassembly;

FIG. 10 is an enlarged, plan view of one of two housing parts making up part of the connecting assembly;

FIG. 11 is a perspective view of the other housing part on the connecting assembly;

FIG. 12 is a plan view of the housing part in FIG. 11;

FIG. 13 is a bottom view of the housing part in FIGS. 11 and 12;

FIG. 18 is an elevation view of a tether making up part of one form of the second subassembly in relationship to a support therefor;

FIG. 19 is a schematic representation of the inventive security system showing another form of the second subassembly in schematic form and configured to cause generation of a detectable alarm signal in the event of a breach; and FIG. 20 is a fragmentary, side elevation view of an alternative form of electronic device with legs on the first subassembly shown with the first subassembly in an operative position thereon.

DETAILED DESCRIPTION OF THE PREFERRED EMBODIMENT

Figure 1:
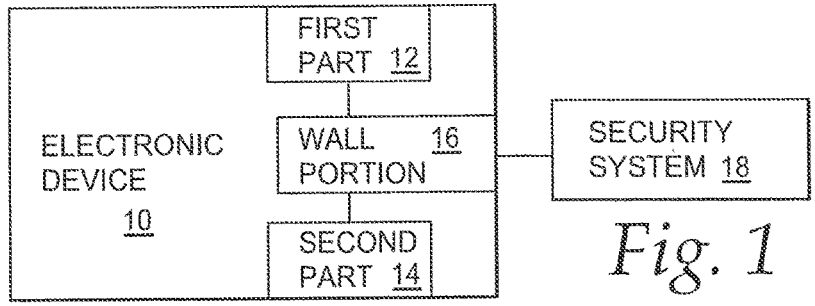
FIG. 1 is a schematic representation of a security system, according to the present invention, used in conjunction with an electronic device.

The present invention is designed for use with an electronic device, as shown schematically at 10 in FIG. 1. The electronic device 10 may take a wide range of different forms. The electronic device 10 may be any device that has first and second parts 12, 14, respectively, between which a wall portion 16 resides. The wall portion 16 may be separate from the parts 12, 14 or integral with one or both of the parts 12, 14. The schematic representation of the electronic device 10 is intended to encompass virtually an unlimited number of electronic device configurations. For example, the parts 12, 14 may be parts that incorporate keyboards or monitors. As just examples, the electronic device 10 might be a tablet, a personal computer, etc. The parts 12, 14 may be hinged relative to each other or may alternatively have a fixed relationship.

As shown also schematically in FIG. 1, the inventive security system 18 is configured to be incorporated at the wall portion 16.

Figure 2:
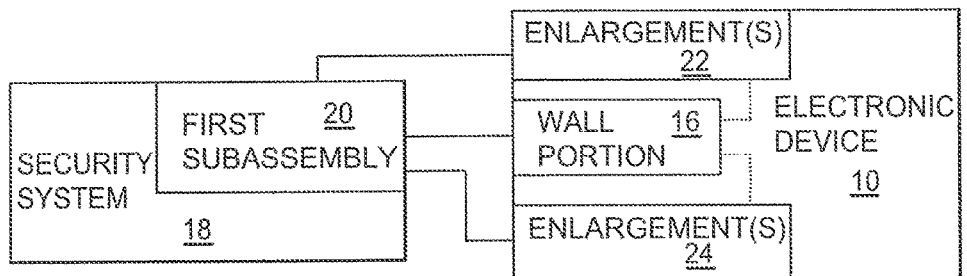
FIG. 2 is a schematic representation showing additional details of the security system and electronic device in FIG. 1, including a first subassembly making up a part of the security system.

As shown in schematic form in FIG. 2, the security system 18 has a first subassembly 20 that is configured to encircle the wall portion 16 on the electronic device 10 with the first subassembly 20 in an operative position. In this operative position, the first subassembly 20 is blocked in moving in one direction relative to the wall portion 16 by at least one enlargement 22, and in an opposite direction by at least one enlargement 24. The enlargements 22, 24 may be formed on the wall portion 16 and/or on other portions of the electronic device 10, such as on the first and/or second parts 12, 14. By blocking this opposite movement, the encircling first subassembly 20 is precluded from being slipped off of the electronic device 10.

As used herein "enlargement" is intended to encompass any structure that blocks passage of the first subassembly 20 thereover.

Figure 3:
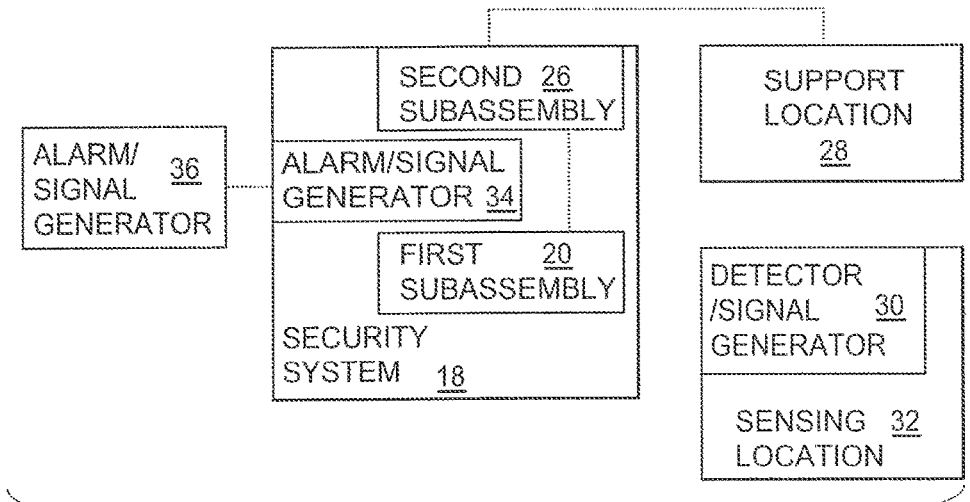
FIG. 3 is a further schematic representation of the inventive security system showing details of a second subassembly that is part of the security system.

As shown in schematic form in FIG. 3, the security system 18 further includes a second subassembly 26. The schematic showing in FIG. 3 is intended to encompass virtually an unlimited number of different mechanical and electromechanical structures that facilitate electronic device restraint and/or monitoring. In one possible form, as shown by dotted lines, the second subassembly 26 is configured to maintain the first subassembly 20 within a controlled distance relative to a support/anchoring location 28. This may involve a physical constraint through a tether that is purely mechanical in nature or one that also forms part of an electrical monitoring circuit.

The second subassembly 26 may be configured to cause the generation of a detectable alarm signal in the event that one of: a) the security system 18 is reconfigured to allow the first subassembly 20 to be changed from its operative position; b) the security system 18 is reconfigured to allow the electronic device 10, together with the first subassembly 20 in the operative position, to be moved beyond a first predetermined range from the support location 28; c) the electronic device 10, together with the first subassembly in the operative position, is moved beyond a second predetermined range from a support location without reconfiguring the electronic device 10 or security system 18; and d) the electronic device 10, together with the first subassembly 20 in the operative position, are moved in a predetermined manner relative to a detector/signal generator 30 at a sensing location 32.

The second subassembly 26 causes generation of a detectable alarm signal in the event of a breach. The second subassembly 26 either has the self-contained ability to generate an alarm or generate a signal to a separate alarm/signal generator 36 upon one of the breach events a)-d), in the prior paragraph, occurring.

Figure 4:
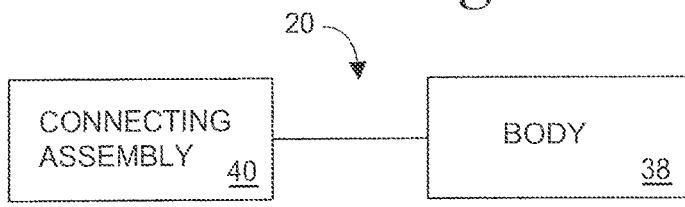
FIG. 4 is a schematic representation of the first subassembly on the security system in FIGS. 1-3 including a body and a connecting assembly.

In its simplest form, as shown in schematic form in FIG. 4, the first subassembly 20 consists of a body 38 and a connecting assembly 40. The body 38 and connecting assembly 40 are configured so that with the first subassembly 20 in the operative position, the body 38 and connecting assembly 40 cooperatively encircle the wall portion 16 on the electronic device 10 and are blocked from being released therefrom by the aforementioned enlargements 22, 24.

The schematic showing of all components in FIGS. 1-4 is intended to encompass virtually an unlimited number of different component configurations as well as their interaction. The technology exists to perform the basic functions required. For example, as in FIG. 3, technology exists to incorporate into the second subassembly 26 structure that either emits a signal or that can detect a signal generated at the sensing location 32, which may be a checkout location or an exit location at a business whereat the electronic devices 10 are displayed and/or sold. The specific embodiments of the security system 18, described hereinbelow, are exemplary in nature only and should not be viewed as limiting.

In FIGS. 5-19, the security system 18 is shown as used in association with an exemplary laptop computer 10 with the first part 12 having a housing 42 upon which a keyboard at 44 is provided. Various operating components for the computer 10 are contained within the housing 42.

The second part 14 has a housing 46 with a monitor 48.

The parts 12, 14 are connected through a hinge structure at 50 that allows the parts 12, 14 to move relative to each other around an axis 52 between an operative relationship, as shown in FIG. 5, and in solid lines in FIG. 6, and a stored relationship, wherein the part 14 assumes the dotted line position in FIG. 6. The hinge structure 50 defines the wall portion 16. The hinge structure 50 may be continuous between the sides 54, 56 of the device 10, as depicted in FIG. 5. Alternatively, the hinge structure 50 may include discrete cooperating components at one or more laterally spaced locations.

Regardless of the precise construction, the wall portion 16 has an effective thickness T1 that is less than the adjacent effective thicknesses T2, T3 of the parts 12, 14, respectively. This allows the first subassembly 28, consisting of the body 38 and connecting assembly 40, to encircle the wall portion 16 and be blocked from sliding in either of opposite directions over the first part or second part 12, 14 by the enlargements 22, 24. In this embodiment, the enlargements define surfaces on the first and second parts 12, 14 bounding the region where the wall portion 16 is situated.

In this embodiment, the wall portion 16 has first and second ends 58, 60 spaced in a lengthwise direction, with the enlargements 22, 24 at the sides thereof. With the first subassembly 20 continuously encircling the wall portion 16, the first subassembly 20 is blocked from moving oppositely sideways in relationship to the lengthwise direction past the enlargements 22, 24 to thereby become separated from the device 10.

As depicted, the body 38 has an elongate shape with a length between third and fourth ends 62, 64, respectively. The body 38 consists of first and second elongate legs 66, 68 and a base 70 joining the legs 66, 68 at the third end 62 of the body 38 in a manner whereby the first and second legs 66, 68 and base 70 cooperatively define a "U" shape. While not necessary, the first and second legs 66, 68 are permanently joined together through the base 70. One possible construction utilizes a continuous formed piece of rod-like material. Alternatively, one or more components might be utilized to join the first and second legs 66, 68 at the third end 62 of the body 38.

As depicted, the first and second legs 66, 68 are made from a square metal material that is welded at the base 70. This particular cross-sectional shape is not required, nor is there a requirement that the body 38 be made from metal.

As seen in FIG. 7, the first and second legs 66, 68 can be flexed about the base 70 whereby the first and second legs 66, 68 are moved away from each other at the fourth end 64, thereby to increase the effective width of the "U".

As seen in FIG. 5, the fourth end 64 of the body 38, as shown in solid lines, can be aligned at the end 58 of the wall portion 16 and advanced lengthwise of the wall portion, as indicated by the arrow 72 whereby the legs 66, 68 slide along the wall portion 16 in guided, straddling relationship until the assembled position, shown in dotted lines, is realized. In the assembled position, the fourth end 64 projects in a lengthwise direction past the second end 60 of the wall portion 16, thereby to allow the connecting assembly 40 and body 38 to be operatively joined.

The connecting assembly 40 consists of a housing 74 with first and second joinable parts 76, 78, respectively. While the housing 74 has a squared, rectangular shape, this is not a requirement.

The housing part 76 defines a receptacle 80 to receive a length of each of the first and second legs 66, 68 at the body end 64. The receptacle 80 has a length L, a width W, and a depth D. The width W is slightly greater than the width W1 of each of the legs 66, 68. The depth D is approximately equal to the dimension D2, that is the width of the "U" at the body end 64, with the legs 66, 68 spread apart to accommodate the wall portion 16. With this arrangement, the ends of the legs 66, 68 can be translated into the receptacle 80 by moving in a path in the direction indicated by the arrow 72, or in an orthogonal path.

The second housing part 78 is joined to the first housing part 76 so that the ends of the legs 66, 68 within the receptacle 80 are captive between the housing parts 76, 78. The second housing part 78 has a perimeter shape matched to the shape of the housing part 76 and oppositely facing flat surfaces 84, 86. The flat surface 86 facially abuts a flat surface 88 on the housing part 76 with the housing parts 76, 78 joined. A countersunk bore 90 through the surface 84 accommodates the head 92 of a fastener 94 that has a shank 96 that is threaded to engage a threaded, blind bore 98 in the housing part 76. The fastener 94 is tightened to fix the relationship of the parts 76, 78. Countersinking of the bore 98 allows the head 92 to assume a flush relationship with the flat surface 84. With the housing parts 76, 78 joined, the surface 86 directly bounds the receptacle 80.

Locating connectors/studs 100 on the housing part 76 are extendable into locating connectors/openings 102 on the housing part 78. The cooperating connectors—the studs 100 on the housing part 76 and the openings 102 on the housing part 78—consistently maintain the first and second housing part 76, 78 in a predetermined joined relationship. Multiple connectors on each housing part 76, 78 are not required, nor is the particular male/female relationship depicted required as the location of the studs 100 and openings 102 can be reversed.

Withdrawal of the portions of the legs 66, 68 from the receptacle 80 is prevented by a component 104 that interacts between the housing 46 and body 38. As depicted, the component 104 is in the form of an elongate post that is directed into the first and second body legs 66, 68 and a blind bore 106 on the housing part 76 at the base of the receptacle 80. In the form shown, the component/post 104 is directed into and through each of the legs 66, 68 and into the bore 106 with the housing part 78 separated from the housing part 76. With the housing part 78 then secured in place, the component/post 104 is captively held in place between the housing parts 76, 78.

With the connecting assembly 40 and body 38 operatively connected, the connecting assembly 40 and body 38 are configured so that the first and second legs 66, 68, base 70, and connecting assembly 40 cooperatively continuously encircle the elongate wall portion 16.

The first subassembly 20 can be assembled by personnel on site at each location where the electronic device 10 is displayed for consumer inspection and handling. With the body 38 slid into the dotted line position in FIG. 5, the portions of the legs 66, 68 can be directed into the receptacle 80, whereupon the component 104 is pressed into place. The housing part 78 can then be put in place and secured to the housing part 76 through the fastener 94.

Figure 17:
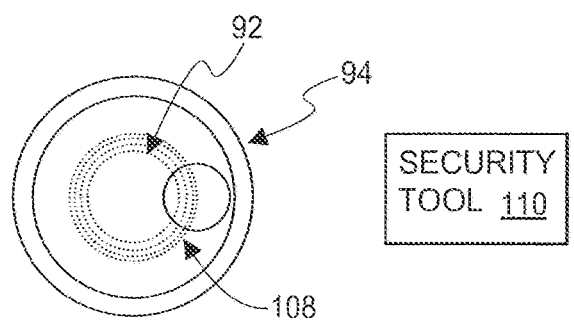
FIG. 17 is an enlarged, plan view of a fastener used to maintain the housing parts together and with a security tool therefor shown in schematic form.

As shown in FIG. 17, the fastener head 92 has a special fitting at 108. A special security tool 110 is provided to engage the fitting 108 to allow turning of the fastener 94 in both tightening and loosening directions. Thus, tampering with the fastener 94, and thus compromising of the first subassembly 20, is prevented.

The first subassembly 20 lends itself to being integrated/combined with the aforementioned second subassembly 26 that may take a multitude of different forms, depending upon the type of control and monitoring that are desired.

In one form, a mechanical tether 112 is utilized, as shown in FIG. 18. The tether 112 may be a metal cable, or have some other construction, with an anchor component 114 thereon. The housing 74 defines a receptacle 116 for the anchor component 114. A groove 118 is formed in the body part 76, contiguous with the receptacle 116, to accommodate a body 120 on the tether 112. With the housing parts 76, 78 joined, the anchor component 114 is captively maintained in the receptacle 116. The groove 118, bounded by the joined housing part 78, has an effective diameter that will accommodate the tether body 120 but will not allow the anchor component 114 to pass therethrough.

A fitting 122, or other suitable structure, may be attached to the tether body 120, remote from the anchor component 114, to allow anchoring to a support 124 at the aforementioned support/anchoring location 28. Accordingly, the first subassembly 20 is maintained within a controlled distance, dictated by the length of the tether 112, relative to the support/anchoring location 28.

As shown in FIG. 19, a tether 126 can be utilized that mechanically restrains the first subassembly 20 and additionally becomes part of an electronic security feature. The tether 126 is conductive and may have one or more connectors 128 that cooperate with one or more connectors 130 on the first subassembly 20 thereby to form an electrical path between an alarm system 132 at the support 124 and the first subassembly 20. The alarm system 132 can be configured to generate a detectable alarm signal in the event that the security system 18 is reconfigured by either disconnecting the tether 126 or severing the tether 126, whereby the electronic device 10 with the first subassembly 20 in the operative position thereon can be moved away from the support 24 beyond the distance permitted by the length of the uncompromised tether 126.

Figure 14:
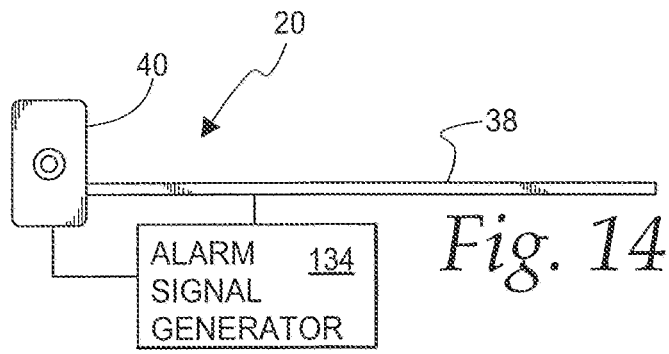
FIG. 14 is a plan view of the first subassembly with one form of second subassembly shown in schematic form.

In an alternative form, as shown in FIG. 14, the second subassembly may include an alarm signal generator 134 that interacts between the body 38 and connecting assembly 40 to generate a signal that in turn causes the generation of a detectable alarm in the event that the first subassembly 20, in its operative position, is reconfigured to be separated from the electronic device 10.

Figure 15:
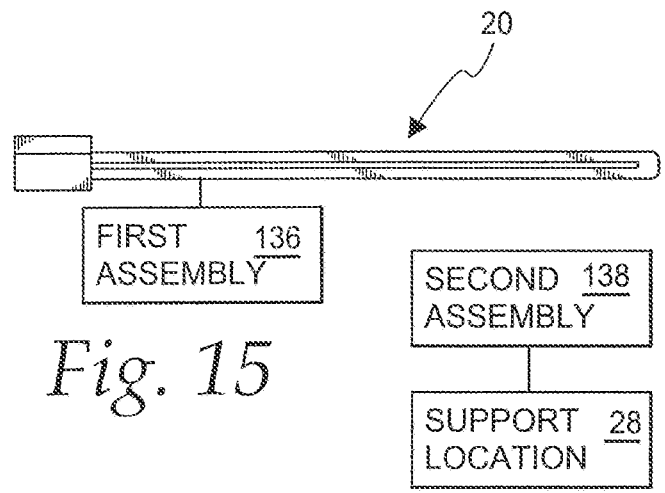
FIG. 15 is a side elevation view of the first subassembly with another form of second subassembly shown in schematic form.
Figure 16:
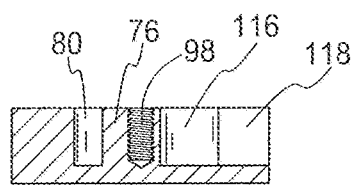
FIG. 16 is a cross-sectional view of the housing taken along line 16-16 of FIG. 9.

As a further alternative, as shown in FIG. 15, the second subassembly 26 may include a first assembly 136 configured to cooperate with a second assembly 138 at the aforementioned support/anchoring location 28. The first and second assemblies 136, 138 cooperate with each other to generate a signal that in turn generates a detectable alarm signal as an incident of the first assembly 136 moving either: a) beyond a certain predetermined range from the support/anchoring location 28; or b) in a predetermined manner relative to the second assembly 138 that makes up at least part of the aforementioned detector/signal generator 30 at the sensing location 32. For example, the detector/signal generator 30 may be at a checkout location. When the first assembly 136 and second assembly 138 are in a certain relationship, they interact to cause the detectable alarm signal generation.

As noted above, the invention is not limited to any particular configuration of electronic device 10. While the exemplary form in FIG. 5 shows a foldable housing arrangement, the invention can be practiced with an electronic device having a fixed configuration, such as that shown at 10' in FIG. 20. In FIG. 20, the device has a wall portion 16' between enlargements 22', 24'. The body 38, together with the connecting assembly (not shown), encircle the wall portion 16' and are blocked against relative sideways movement by the enlargements 22', 24'.

In FIG. 5, the keyboard 44 is shown with an optional folding construction. The keyboard 44 may be separated and folded in half, or otherwise, about the dotted line 140. The region at the fold line 140 may function as the aforementioned wall portion 16 to be encircled by the first subassembly 20.

The foregoing disclosure of specific embodiments is intended to be illustrative of the broad concepts comprehended by the invention.

The invention claimed is:

1. In combination:
   a) an electronic device comprising a wall portion with first and second ends spaced in a lengthwise direction and at least one enlargement on each of opposite sides of the wall portion; and
   b) a security system comprising:
   a first subassembly that is configured to be placed in an operative position on the electronic device wherein the first subassembly encircles the wall portion and is blocked from moving in opposite sideways directions by at least first and second of the enlargements; and
   a second subassembly configured to at least one of: i) the first subassembly within a controlled distance relative to a support location; or ii) cause the generation of a detectable alarm signal in the event that one of:
      A) one of the security system and electronic device is reconfigured to allow the first subassembly to be changed from the operative position;
      B) the security system is reconfigured to allow the electronic device together with the first subassembly in the operative position to be moved beyond a first predetermined range from the support location;
      C) the electronic device together with the first subassembly in the operative position are moved beyond a second predetermined range from the support location without reconfiguring the electronic device or security system; and
      D) the electronic device together with the first subassembly in the operative position are moved in a predetermined manner relative to a detector/signal generator at a sensing location,
      wherein the first subassembly comprises an elongate body having third and fourth ends spaced in a lengthwise direction, the elongate body comprising first and second elongate legs and a base joined together at the third end of the body so that the first and second legs and base cooperatively define a "U" shape, each of the first and second legs having a length, wherein the elongate body and electronic device are configured so that the elongate body and electronic device can be moved relative to each other from an initially separated relationship by causing a part of the electronic device to move between the first and second legs whereby the elongate body assumes an assembled position wherein the body is blocked by the first and second enlargements from moving in the opposite sideways directions as would allow the elongate body to be separated from the electronic device.

2. The combination according to claim 1 wherein the first subassembly comprises an elongate body having third and fourth ends spaced in a lengthwise direction, the elongate body comprising first and second elongate legs and a base joined together at the third end of the body so that the first and second legs and base cooperatively define a "U" shape, each of the first and second legs having a length.

3. The combination according to claim 2 wherein the first and second legs and base are permanently joined together at the third end of the body.

4. The combination according to claim 2 wherein the body is configured so that the first and second legs can be moved away from each other at the fourth end of the body to increase a width of the "U".

5. The combination according to claim 2 wherein the security system further comprises a connecting assembly, the connecting assembly and body configured so that with the first subassembly in the operative position, the first and second legs, base, and connecting assembly cooperatively encircle the elongate wall portion.

6. The combination according to claim 1 wherein the second subassembly comprises a tether projecting from the first subassembly.

7. The combination according to claim 5 wherein the connecting assembly comprises a housing with first and second joinable parts, the first and second legs at the fourth end of the body captively maintained between the first and second housing parts with the first subassembly in the operative position.

8. The combination according to claim 7 wherein the first subassembly comprises a component that extends into: a) the body, at the fourth end of the body; and b) the housing to prevent separation of the fourth end of the body from the housing with the first subassembly in the operative position.

9. The combination according to claim 8 wherein the component extends through each of the first and second legs.

10. The combination according to claim 7 wherein the second subassembly comprises a tether with an anchor component and the housing is configured to define a receptacle for the anchor component.

11. The combination according to claim 7 wherein there are connectors on the first and second housing parts that cooperate to align the first and second housing parts in a predetermined joined relationship.

12. The combination according to claim 7 wherein the connecting assembly further comprises a threaded fastener that is configured to releasably maintain the first and second housing parts in a joined relationship.

13. The combination according to claim 7 wherein the connecting assembly comprises a housing with first and second joinable parts, the housing defining a receptacle for the fourth end of the body.

14. The combination according to claim 13 wherein the connecting assembly further comprises a component that interacts between the housing and fourth end of the body to prevent withdrawal of the fourth end of the body from the housing receptacle with the first subassembly in the operative position.

15. The combination according to claim 14 wherein the component comprises an elongate post.

16. The combination according to claim 1 wherein the second subassembly comprises a first assembly configured to cooperate with a second assembly, the second assembly at the support location, the first and second assemblies configured to cooperate with each other to cause generation of a detectable alarm signal as an incident of the first assembly moving either: a) beyond a second predetermined range from the support location; or b) in the predetermined manner relative to the second assembly that makes up at least a part of the detector/signal generator at the sensing location.

17. The combination according to claim 1 wherein the electronic device comprises first and second parts between which the wall portion resides.

18. The combination according to claim 1 wherein the electronic device is one of: a) a tablet; b) a personal computer; c) a device with a keyboard and monitor, and d) a keyboard.

19. The combination according to claim 1 wherein the second subassembly comprises an elongate cord extending between the electronic device and an anchoring location, the elongate cord defining a part of an electronic circuit including an alarm signal generator.

20. The security system recited in claim 1.

* * * * *